No. 757,147. Patented April 12, 1904.

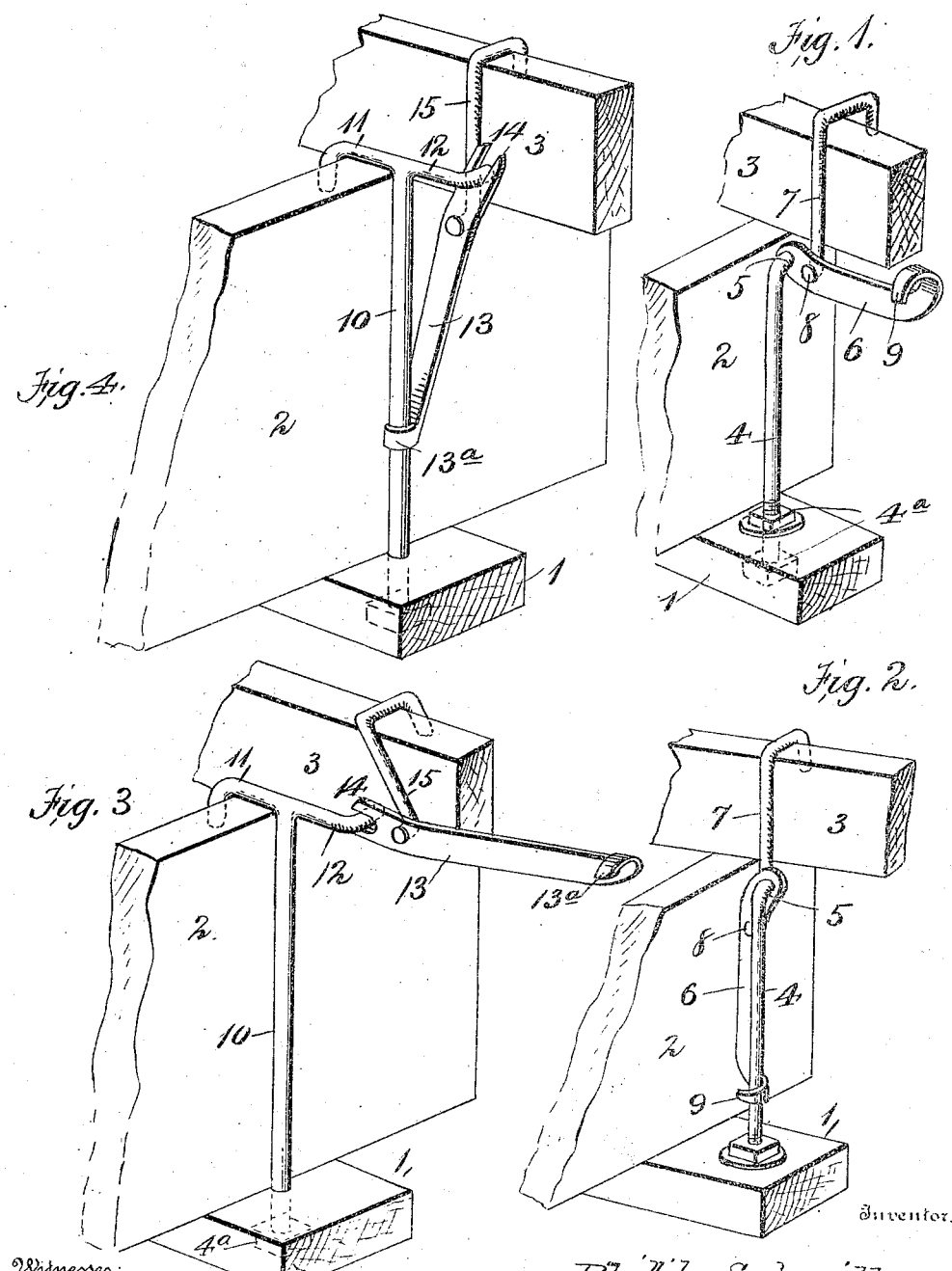

UNITED STATES PATENT OFFICE.

PHILLIP SCHMITT, OF PARKER, SOUTH DAKOTA.

CLAMP FOR HAY-RACKS.

SPECIFICATION forming part of Letters Patent No. 757,147, dated April 12, 1904.

Application filed November 24, 1902. Renewed August 29, 1903. Serial No. 171,299. (No model.)

*To all whom it may concern:*

Be it known that I, PHILLIP SCHMITT, a citizen of the United States, residing at Parker, in the county of Turner and State of South Dakota, have invented new and useful Improvements in Clamps for Hay-Racks, of which the following is a specification.

My invention relates to improvements in clamps for hay-racks; and the object of the same is to construct a clamp for securing the top of a hay-rack on the lower portion without using bolts, which clamp will be easily detachable and will permit the top to be removed without the use of a wrench.

The simple and novel construction employed by me in carrying out my invention is fully described and claimed in this specification and illustrated in the accompanying drawings, forming a part thereof, in which—

Figure 1 is a perspective of my device ready for locking. Fig. 2 is a like view of the same locked. Fig. 3 is a perspective of a modified form of my device unlocked. Fig. 4 is a similar view of the same locked.

Like numerals of reference designate like parts in the different views of the drawings.

The numeral 1 designates a bed-piece of my rack, and 2 a cross-bar resting on said bed-piece. A side bar 3, forming a part of the detachable portion of my rack, rests on the cross-bar. A standard 4 is footed on the bed-piece 1 and is rigidly secured by nuts $4^a$. The standard 4 has an arm 5 formed integral therewith, and fulcrumed on this arm is a locking-lever 6, which carries a hook 7, pivoted by its shank 8 to the lever 6. The hook 7 is made angular to adapt it to engage the side bar 3. A hooked catch 9 is formed on the free end of the lever 6 to serve to engage the standard 4 to limit the swing of the lever 6 and to secure it in its locked position.

In operation the lever 6 is raised up into the position shown in Fig. 1, with the hook 7 above the side bar 3. The lever 6 is then depressed, thereby bringing the hook 7 into engagement with the side bar 3 and the catch 9 into engagement with the standard 4. The catch 9 is made long enough so that the lever passes the dead-center on its downward movement and is therefore securely locked.

The manner of disengaging the hook 7 to remove the rack is obvious.

In the modified form illustrated in Figs. 3 and 4 a standard 10 is employed, which has a hooked arm 11 thereon, which engages the cross-bar 2. An arm 12 is also formed on the standard 10 to serve as a fulcrum for a lever 13, having prongs 14 thereon which engage the arm 12. A hook 15, similar to the hook 7, is carried by the lever and engages the side bar 3. The lever 13 is provided with a catch $13^a$, similar to the catch 9 and for an identical purpose. The operation of the modified form will be obvious from what has already been said.

I do not wish to be limited as to details of construction, as these may be modified in many particulars without departing from the spirit of my invention.

Having thus described my invention, what I claim as new, and desire to secure by Letters Patent, is—

1. In a clamp for hay-racks, the combination of a standard bearing an arm, a lever fulcrumed on said arm and bearing a hook located to engage said standard to limit the swing of said lever, and a hook pivoted to said lever and adapted to engage the side bar of a hay-rack, substantially as described.

2. In a clamp for securing hay-racks, the combination of a standard bearing a hook engaging the cross-bar of a hay-rack, a lever fulcrumed on said standard and bearing a hook located to engage said standard, and a hook pivoted to said lever and constructed to engage the side bar of a hay-rack, substantially as described.

3. In a clamp, the combination of a support, a locking-lever fulcrumed on said support and bearing a hook constructed to engage said support to limit the swing of said lever, and a hook pivoted to said lever, substantially as described.

In testimony whereof I have hereunto set my hand in presence of two subscribing witnesses.

PHILLIP SCHMITT.

Witnesses:
E. HUDSMITH,
A. M. FISHER.